Sept. 13, 1960 J. C. LAMBERT 2,952,109
CUTTER ATTACHMENT FOR CORN PICKER
Filed Aug. 2, 1957 2 Sheets-Sheet 1

Joseph Claude Lambert
INVENTOR.

BY *Clarence A. O'Brien*
*and Harvey B. Jacobson*
Attorneys

Sept. 13, 1960    J. C. LAMBERT    2,952,109
CUTTER ATTACHMENT FOR CORN PICKER
Filed Aug. 2, 1957    2 Sheets-Sheet 2

Joseph Claude Lambert
INVENTOR.

2,952,109

CUTTER ATTACHMENT FOR CORN PICKER

Joseph Claude Lambert, R.F.D., Bourbonnais, Ill.

Filed Aug. 2, 1957, Ser. No. 675,874

2 Claims. (Cl. 56—18)

The present invention generally relates to a cutting device and more particularly to a stalk cutter for association with a corn picker whereby the corn may be picked from the stalks by the corn picker after which the stalk may be cut up into small pieces by the cutter attachment of the present invention thus eliminating the necessity of chopping or cutting the stalks as a separate operation thereby reducing the time, effort and cost in cutting the corn stalks and depositing the same on the field for use in enriching the soil.

An object of the present invention is to provide a cutter attachment for attachment to corn pickers and for trailing attachment to a tractor for receiving power from a tractor for driving a pair of rotatable cutter blades mounted within a housing having inlet and discharge means for the stalks whereby two rows of corn stalks may be cut, chopped and discharged back onto the soil simultaneously with the corn picking operation.

Other objects of the present invention will reside in its simplicity of construction, ease of attachment, efficiency of operation, adaptation for its particular purposes and its relatively inexpensive manufacturing cost.

Figure 1:
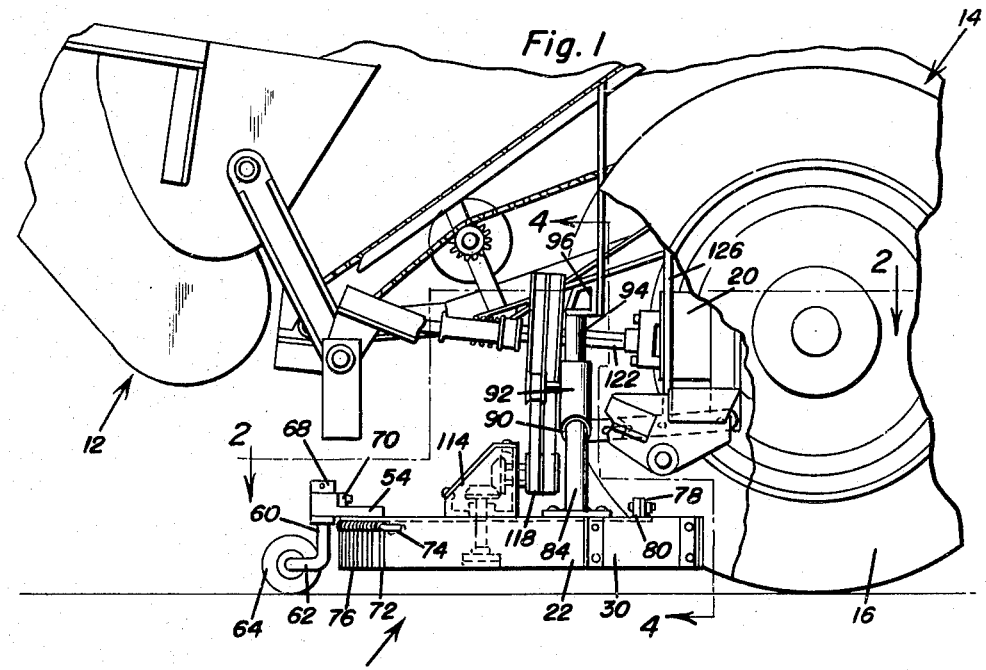
Figure 1 is a side elevational view of the cutter attachment of the present invention mounted on a corn picker and tractor with portions of the tractor being broken away for purposes of clarity of the structure.
Figure 4:
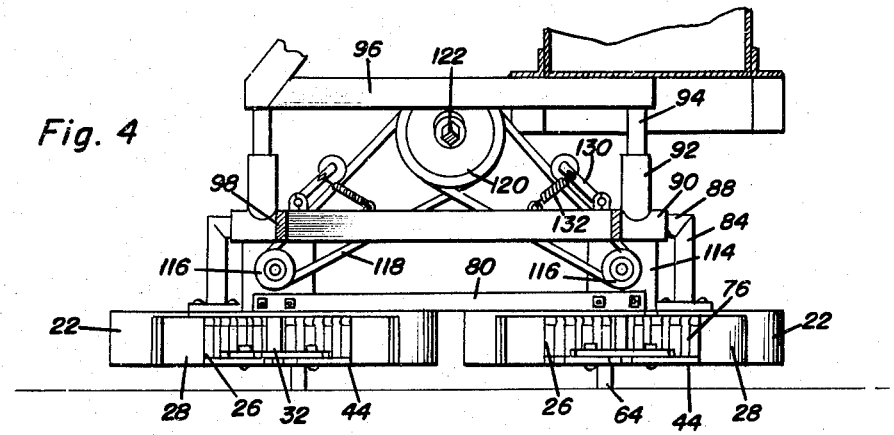
Figure 4 is a vertical sectional view taken substantially upon a plane passing along section line 4—4 of Figure 1 illustrating the front elevational details of the cutter attachment.
Figure 5:
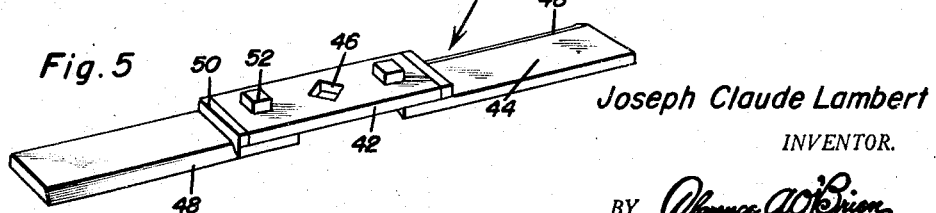
Figure 5 is an enlarged perspective view of one of the cutter blades illustrating the construction thereof.
Figure 2:
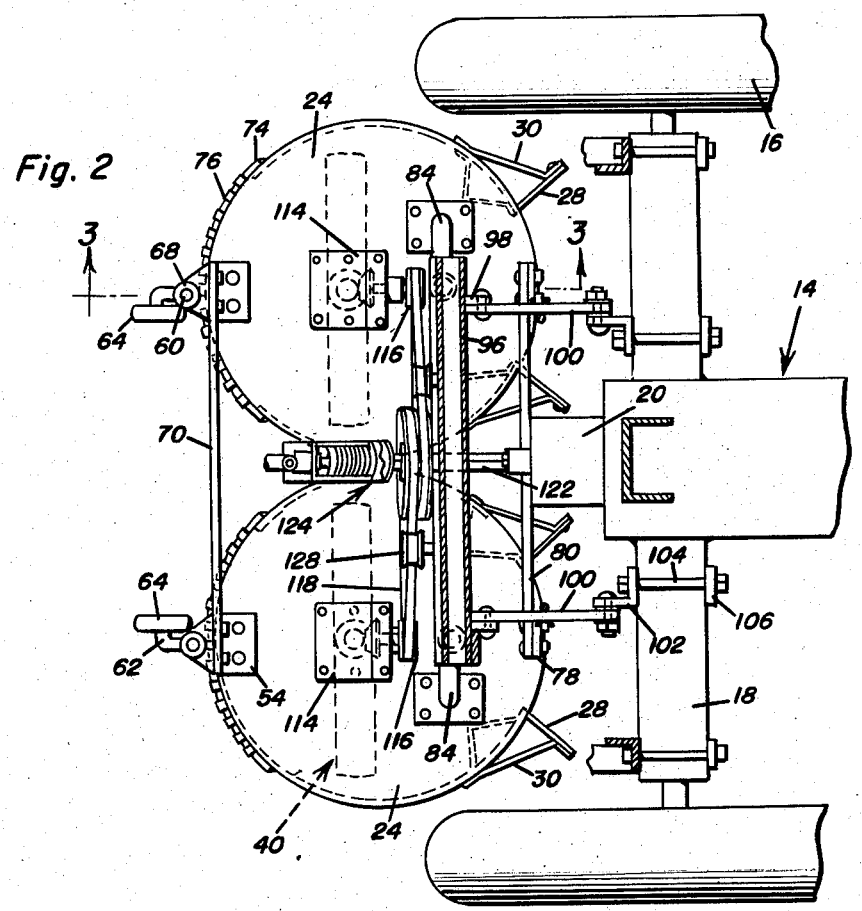
Figure 2 is a plan sectional view taken substantially upon a plane passing along section line 2—2 of Figure 1 illustrating the arrangement of the pair of cutter blades and the support mechanism therefor.
Figure 3:
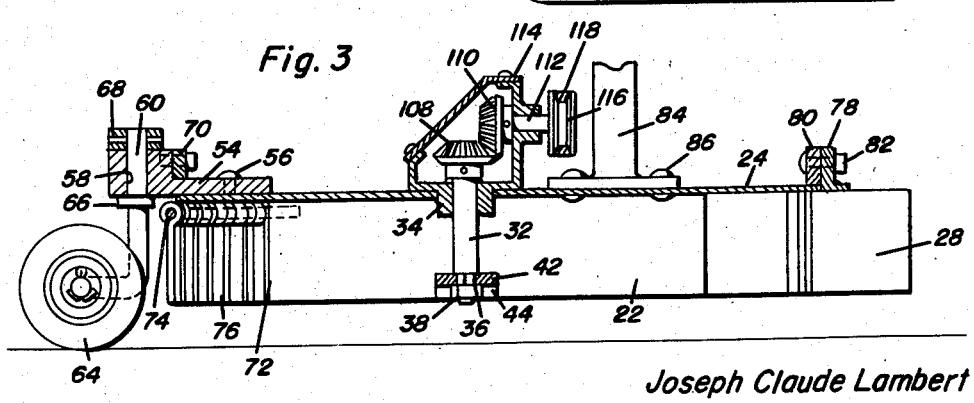
Figure 3 is a transverse, vertical sectional view, on an enlarged scale taken substantially upon a plane passing along section line 3—3 of Figure 2 illustrating the details of construction of the cutter unit.

Referring now specifically to the drawings, the numeral 10 generally designates the cutter attachment of the present invention for use in conjunction with a corn picker generally designated by the numeral 12 and a tractor generally designated by numeral 14. The corn picker is of any conventional type as is the tractor which normally is provided with rear driving wheels 16 and a transverse axle housing 18 as well as a power take-off 20. Normally, the corn picker is mounted in such a manner that the corn will be picked before the cutter attachment 10 engages the stalks inasmuch as the corn pickers normally have their stripping mechanisms disposed forwardly of the rear wheels 16 of the tractor 14.

The cutter attachment 10 includes a pair of substantially cylindrical housings 22 having a top plate 24 disposed substantially horizontally. The forward end of each cylindrical housing 22 is provided with an enlarged inlet opening 26 having outwardly diverging deflector plates 28 for guiding stalks into the inlet opening 26. The deflector plates 28 are braced to the housing 22 by brace members 30. Centrally disposed in each of the housings 22 is a vertical shaft 32 journaled in an adapter fitting 34 in the top plate 24. The lower end of the vertical shaft 32 is provided with a polygonal portion 36 and a screw-threaded removable nut 38 on the lower end thereof for detachably mounting a cutter blade generally designated by numeral 40 and including a central section 42 and a pair of outer sections 44. The central section is provided with a polygonal aperture 46 for receiving the polygonal portion 46 of the shaft 32 for rotating the cutter blade 40.

Each of the outer sections 44 is provided with a beveled sharpened edge 48 and an upstanding rib or shoulder 50 in spaced relation to one end thereof. The shoulder 50 is engaged with the outer end of the central section 42 and a bolt fastener 52 extends through the outer end portion of the central section 42 and the inner end portion of the outer section 44 whereby the outer sections 44 will be rigidly and detachably retained in longitudinal alignment with the central section 42 whereby rotation of the blade 40 by virtue of it being mounted on the shaft 32 will cut stalks disposed within the housing 22. It is noted that the plane of the cutting blade 40 is substantially the same as the horizontal plane of the lower edge of the housing 22.

A rearwardly extending bracket 54 is mounted at the rear edge of the top plate 24 by suitable fastening means 56 and the bracket 54 is provided with a vertical bore 58 therein swively receiving a vertical shank or rod 60 having a rearwardly and laterally extending lower end 62 for journalling a wheel 64 thereon with the shank 60 being capable of rotation about a vertical axis due to the shoulder 66 engaging the bottom of the bracket 54 and a retainer 68 engaging the top surface of the bracket 54 whereby the rear end portion of the cutter attachment will be supported by the caster wheels 64.

The brackets 54 on the top plates 24 are interconnected by a transverse brace bar 70 which retains the housings 22 in spaced relation and maintains the housings in a constant elevational relationship.

The rear portion of the housing 22 is provided with an enlarged discharge opening 72 for permitting discharge of foreign objects such as rocks or the like and also for permitting discharge of the chopped stalks. Adjacent the upper edge of the opening 72 is an arcuately curved supporting rod 74 having a plurality of rods 76 pivotally mounted thereon and depending therefrom and generally forming a closure for the discharge opening 72. The force of gravity will retain the rods 76 in substantially vertical position which will retain the stalks within the housing until they are completely chopped up in the desired manner so that they may be discharged onto the soil in a finely chopped condition but which will permit any foreign objects such as rocks, clods or the like to be thrown from the housing 22 by the centrifugal force created by the blade as it rotates and picks up such foreign objects.

Adjacent the front end of each top plate 24 is provided an upstanding lug 78 which are interconnected by a rigid brace member 80 secured to the lug 78 by fastening means 82.

Intermediate the lugs 78 and the brackets 54 and disposed laterally outwardly of the adapters 34 is an upstanding support post 84 secured to the plate 24 by fastening means 86. The upper ends of the supporting posts 84 are inturned as designated by numeral 88 for reception in a transverse tubular member 90 which also has upstanding tubular members 92 connected with upstanding members 94 supported from a transverse frame element 96. The transverse tubular member 90 is provided with a pair of forwardly extending lugs 98 connected with links 100 having the forward ends thereof supported from brackets 102 secured rigidly to the axle housing 18 by fastening bolts 104 and clamp members 106.

For driving each of the blades 40, the vertical shaft 32 is provided with a bevel gear 108 on the upper end thereof in meshing engagement with a bevel gear 110 on a stub shaft 112 journaled in a housing 114 which encloses both of the gears 108 and 110. The outer end of the stub shaft 112 is provided with a V-belt pulley 116 having a V-belt 118 disposed thereon. The V-belts 118 extend inwardly and engage a double V-belt pulley 120 mounted on a power take-off shaft 122 connected with the power take-off mechanism 20. The power take-off shaft 122 extends through the pulley 120 and also drives the corn picker mechanism controlled by virtue of a clutch mechanism generally designated by numeral 124.

The transverse support member 96 forming a part of the frame of the corn picker is movable with the corn picker so that the device may be left attached to the corn picker if so desired. The links 100 are provided with upstanding connecting tie rods 126 which may be attached to the lift arms of the conventional tractor whereby the device may be raised and lowered and whereby the device may be used independently of the corn picker 12.

Belt tightener pulleys 128 are in engagement with the V-belts 118 and these pulleys are mounted on pivotal support arms 130 and the support arms 130 are spring urged by a tension coil spring 132 into engagement with the V-belts 118 for retaining the V-belts 118 taut for driving the cutter blades in the desired rotational manner. It is pointed out that the V-belt drive permits slippage in the event the cutter blade 40 accidentally engages a stationary object thus preventing damage to the drive mechanism as well as to the blade itself.

While the device has been specifically described as being used in conjunction with a corn picker, it is pointed out that the device could be employed as a stalk cutter unit per se with the caster wheels together with the supporting attachment to the tractor being sufficient to accurately support and position the cutter device. Also, the various rotational portions of the device may be provided with suitable lubrication fittings. In operation, the deflector plates 28 guide the stalks into the housings 22 whereupon the rotatable blades 40 will chop and cut the stanks into a finely ground mass and drop the same back onto the soil with any large objects passing out through the rear by pushing the rods 76 out of the way which also act to retain the stalks for the normal cutting and chopping operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A stalk cutter adapted to be used in combination with a tractor having a power take-off and a rear axle housing and a corn picker mounted on said tractor, said stalk cutter adapted to be disposed in trailing relation to the tractor and the corn picker for cutting stalks after they have passed through the corn picker, said stalk cutter comprising a downwardly opening cylindrical housing, castor wheel means mounted on the rear of the housing for supporting the rear end of the housing from the ground surface, means on the housing adapted to support the forward end of the housing from the tractor and the corn picker for pivotal movement about a transverse axis, a vertical shaft journaled in the housing, a horizontal blade mounted on said shaft and rotatable within the housing, means connected to the upper end of the shaft for rotating the same, said last-named means including a drive pulley adapted to be drivingly connected with the tractor power take-off, said housing including a depending peripheral flange, said flange having an inlet opening in the front thereof defined by an omitted portion of the flange and an outlet opening in the rear thereof defined by an omitted portion of the flange with the omitted portions extending the full height of the flange, guide plates diverging forwardly from the vertical edges of the inlet opening for guiding stalks into the housing for cutting by the rotatable blade, and means supported from the housing adjacent the upper edge of the flange and forming a closure for the outlet opening for retaining the stalks within the housing for fine chopping, said closure forming means being openable by engagement of heavy foreign objects therewith while under the influence of centrifugal force.

2. The combination of claim 1 wherein said closure forming means includes an arcuate rod attached to the flange adjacent the upper edge thereof and extending along the upper edge of the outlet opening, a plurality of freely swingable pins pivotally supported on the arcuate rod, said pins being completely independent of each other and having the lower ends terminating in the same horizontal plane as the lower end of the flange thereby normally closing the outlet opening with only the pins engaged by a foreign object being swung outwardly thereby retaining substantially all of the stalks for fine cutting.

References Cited in the file of this patent

UNITED STATES PATENTS

| | | |
|---|---|---|
| 2,484,802 | Aasland | Oct. 18, 1949 |
| 2,681,536 | Kuhary | June 22, 1954 |
| 2,706,879 | Barrentine | Apr. 26, 1955 |
| 2,751,737 | Herod | June 26, 1956 |
| 2,801,510 | Colburn | Aug. 6, 1957 |
| 2,815,631 | Northcote et al. | Dec. 10, 1957 |